US012530991B1

(12) United States Patent
Guisse

(10) Patent No.: US 12,530,991 B1
(45) Date of Patent: Jan. 20, 2026

(54) ROAD SIGN-COVERING SYSTEM

(71) Applicant: Abdoul Guisse, Canal Winchester, OH (US)

(72) Inventor: Abdoul Guisse, Canal Winchester, OH (US)

(*) Notice: Subject to any disclaimer, the term of this patent is extended or adjusted under 35 U.S.C. 154(b) by 84 days.

(21) Appl. No.: 18/656,703

(22) Filed: May 7, 2024

(51) Int. Cl.
*G09F 7/18* (2006.01)

(52) U.S. Cl.
CPC ........ *G09F 7/18* (2013.01); *G09F 2007/1843* (2013.01); *G09F 2007/1847* (2013.01); *G09F 2007/1856* (2013.01); *G09F 2007/1891* (2013.01)

(58) Field of Classification Search
CPC ............... G09F 7/18; G09F 2007/1843; G09F 2007/1847; G09F 2007/1856; G09F 2007/1891
USPC .................................................... 40/612, 797
See application file for complete search history.

(56) References Cited

U.S. PATENT DOCUMENTS

| | | | | |
|---|---|---|---|---|
| 1,387,933 A * | 8/1921 | Mollet | G09F 7/18 40/479 |
| 2,052,771 A * | 9/1936 | Johnson | G09F 7/002 40/607.09 |
| 4,606,140 A * | 8/1986 | Mitchell | B44D 3/00 40/797 |
| 4,793,082 A * | 12/1988 | Petrick | G09F 7/22 40/607.09 |
| 5,218,775 A | 6/1993 | Singer | |
| 6,148,555 A * | 11/2000 | Beauchamp | G09F 7/18 40/611.01 |
| 6,196,938 B1 * | 3/2001 | Wiedner | A63B 63/083 473/481 |
| 6,209,598 B1 | 4/2001 | Petrey | |
| 7,458,176 B1 * | 12/2008 | Schnabel | E01F 9/669 40/611.11 |
| D744,042 S | 11/2015 | Kreindel | |
| 9,828,730 B2 | 11/2017 | Melancon, Jr. | |
| 10,395,567 B2 | 8/2019 | Harter | |
| 11,610,518 B1 * | 3/2023 | DiTella | G09F 13/16 |

FOREIGN PATENT DOCUMENTS

| | | | |
|---|---|---|---|
| AU | 2008100979 A4 * | 11/2008 | G09F 7/06 |
| JP | 4693312 B2 * | 6/2011 | |
| KR | 102215008 B1 * | 2/2021 | E01F 9/61 |
| WO | 2009055875 | 5/2009 | |

* cited by examiner

*Primary Examiner* — Cassandra Davis
(74) *Attorney, Agent, or Firm* — Kyle A. Fletcher, Esq.

(57) ABSTRACT

The road sign covering system is a traffic control device. The road sign covering system incorporates a road sign structure and an enclosure structure. The road sign covering system is a temporary device used to reconfigure the sentiment generated by the road sign structure by changing the image displayed from the road sign structure. The road sign covering system forms a protection space that prevents the original image on the road sign structure from generating misleading sentiments regarding the temporary traffic control instruction currently in effect. The road sign structure is the structure of the road sign covering system that presents the permanent traffic control instruction intended to be displayed at a location. The enclosure structure is the structure that: a) obscures the permanent traffic control instruction displayed by the road sign structure; and, b) displays the temporary traffic control instruction currently in effect.

8 Claims, 6 Drawing Sheets

ROAD SIGN-COVERING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of means for attaching signs to a supporting structure. (G09F7/18)

SUMMARY OF INVENTION

The road sign covering system is a traffic control device. The road sign covering system comprises a road sign structure and an enclosure structure. The road sign covering system is a temporary device used to reconfigure the sentiment generated by the road sign structure by changing the image displayed from the road sign structure. The road sign covering system forms a protection space that prevents the original image on the road sign structure from generating misleading sentiments regarding the temporary traffic control instruction currently in effect. The road sign structure is the structure of the road sign covering system that presents the permanent traffic control instruction intended to be displayed at a location. The enclosure structure is the structure that: a) obscures the permanent traffic control instruction displayed by the road sign structure; and, b) displays the temporary traffic control instruction currently in effect.

These together with additional objects, features and advantages of the road sign covering system will be readily apparent to those of ordinary skill in the art upon reading the following detailed description of the presently preferred, but nonetheless illustrative, embodiments when taken in conjunction with the accompanying drawings.

In this respect, before explaining the current embodiments of the road sign covering system in detail, it is to be understood that the road sign covering system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the road sign covering system.

It is therefore important that the claims be regarded as including such equivalent construction insofar as they do not depart from the spirit and scope of the road sign covering system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
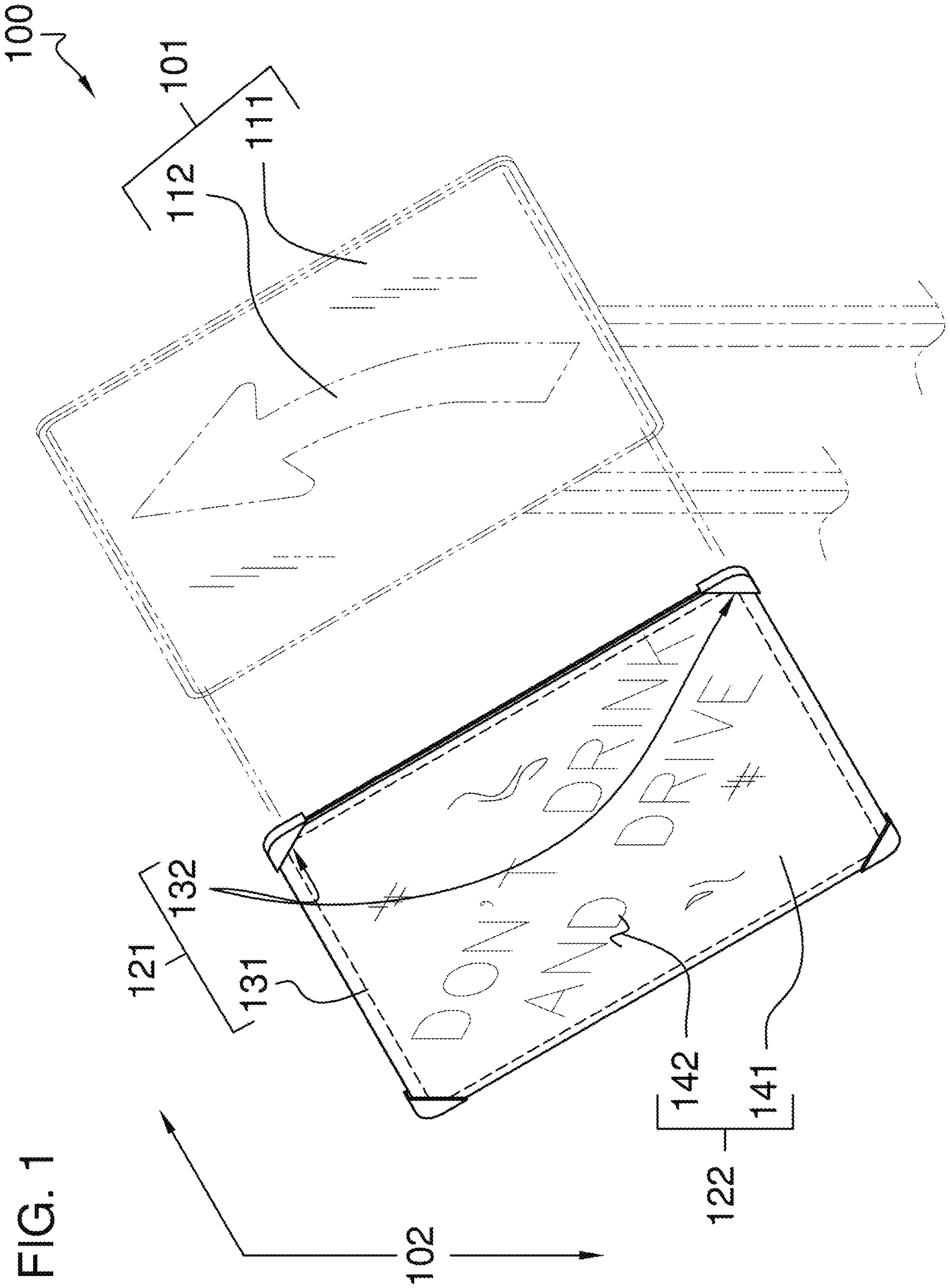
FIG. 1 is a perspective view of an embodiment of the disclosure.
Figure 2:
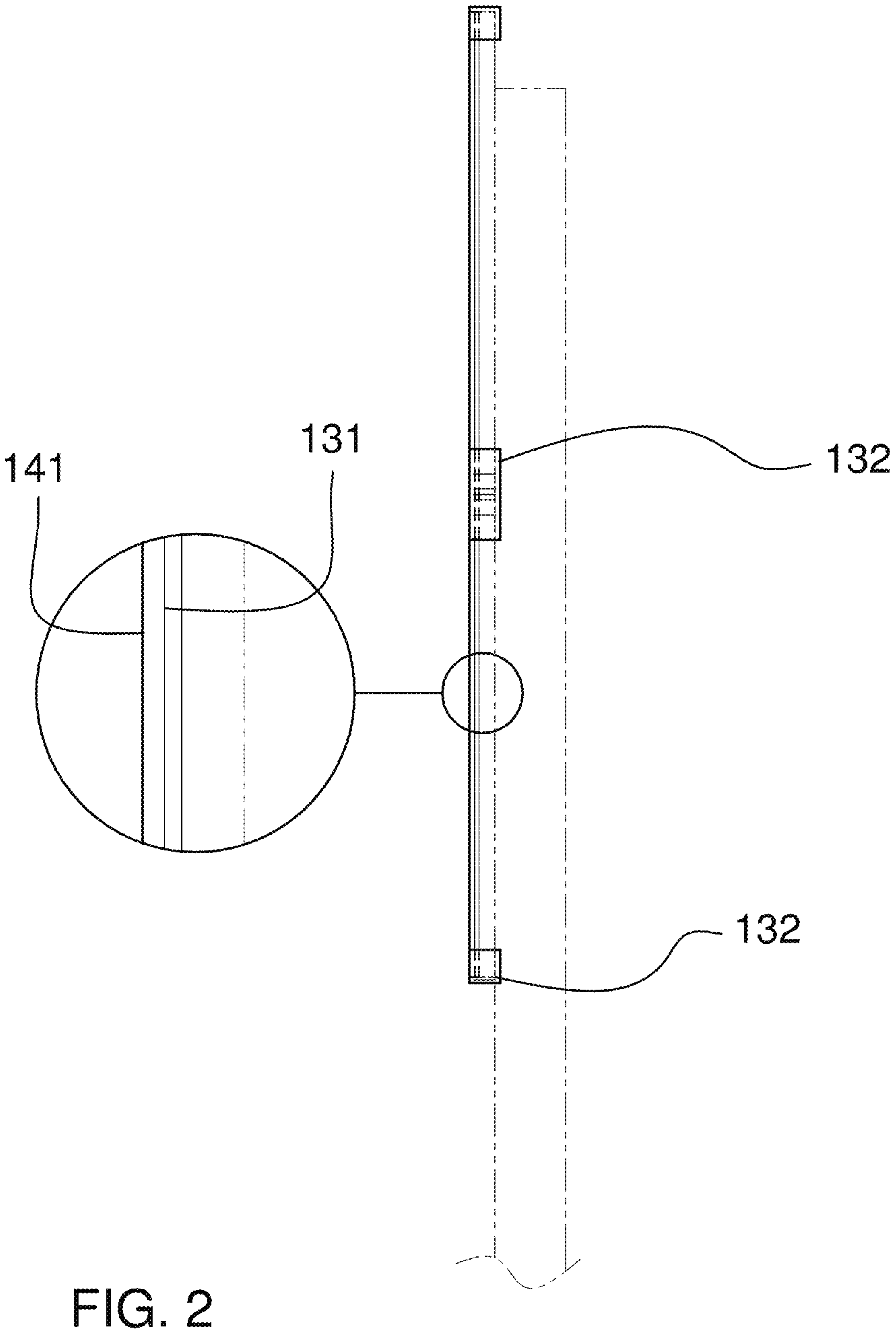
FIG. 2 is a side view of an embodiment of the disclosure.
Figure 3:
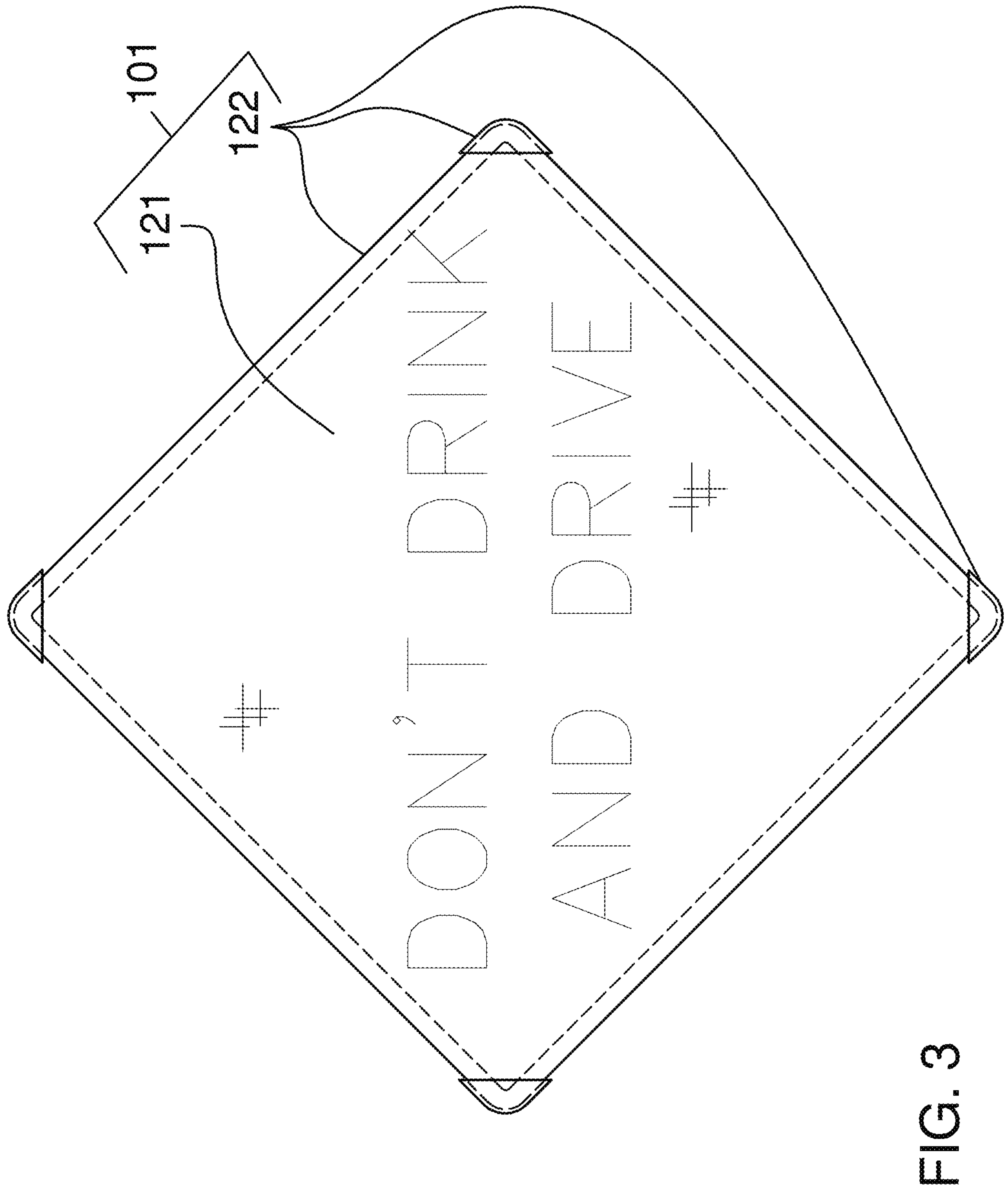
FIG. 3 is a front view of an embodiment of the disclosure.
Figure 4:
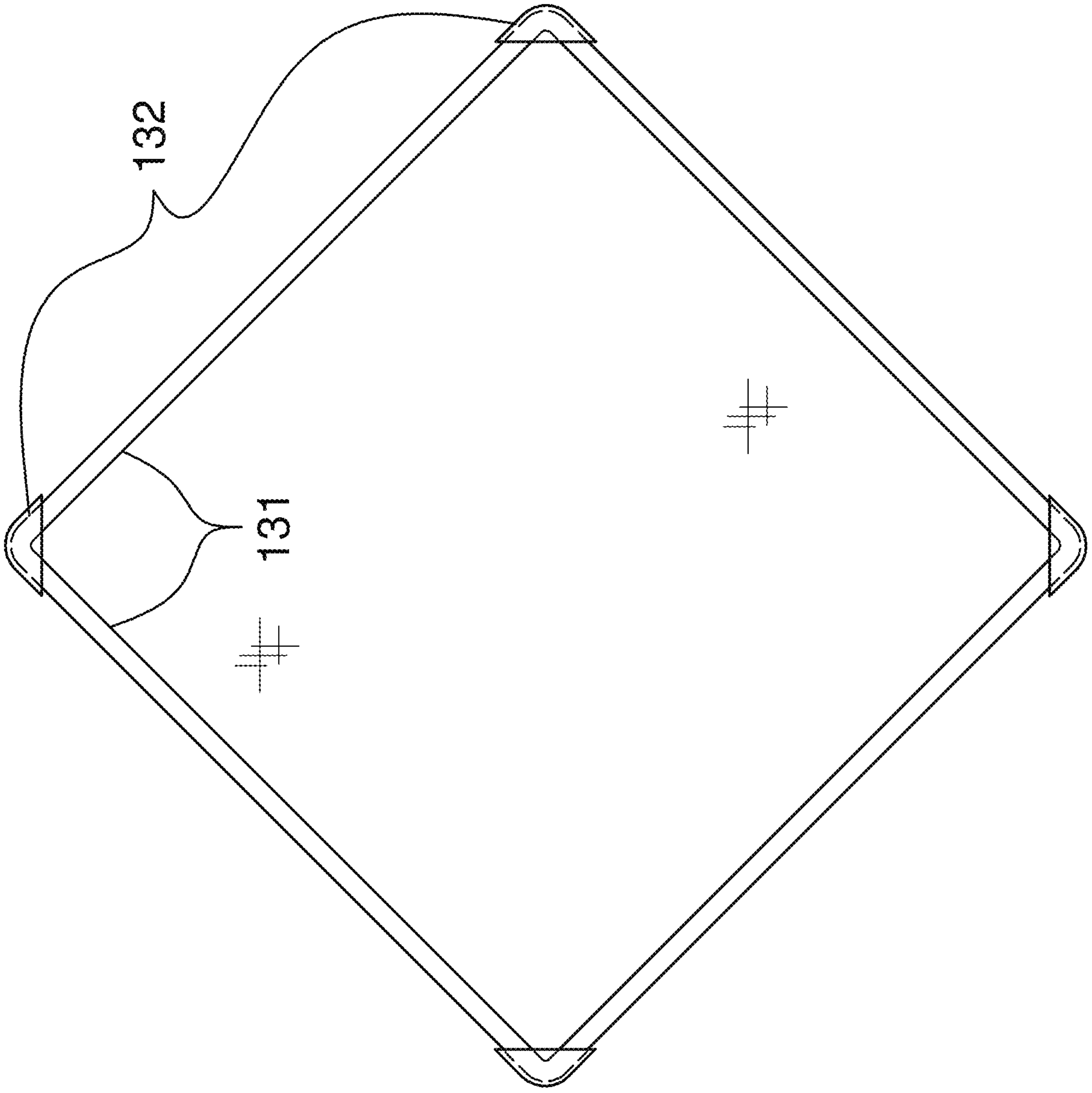
FIG. 4 is a rear view of an embodiment of the disclosure.
Figure 5:
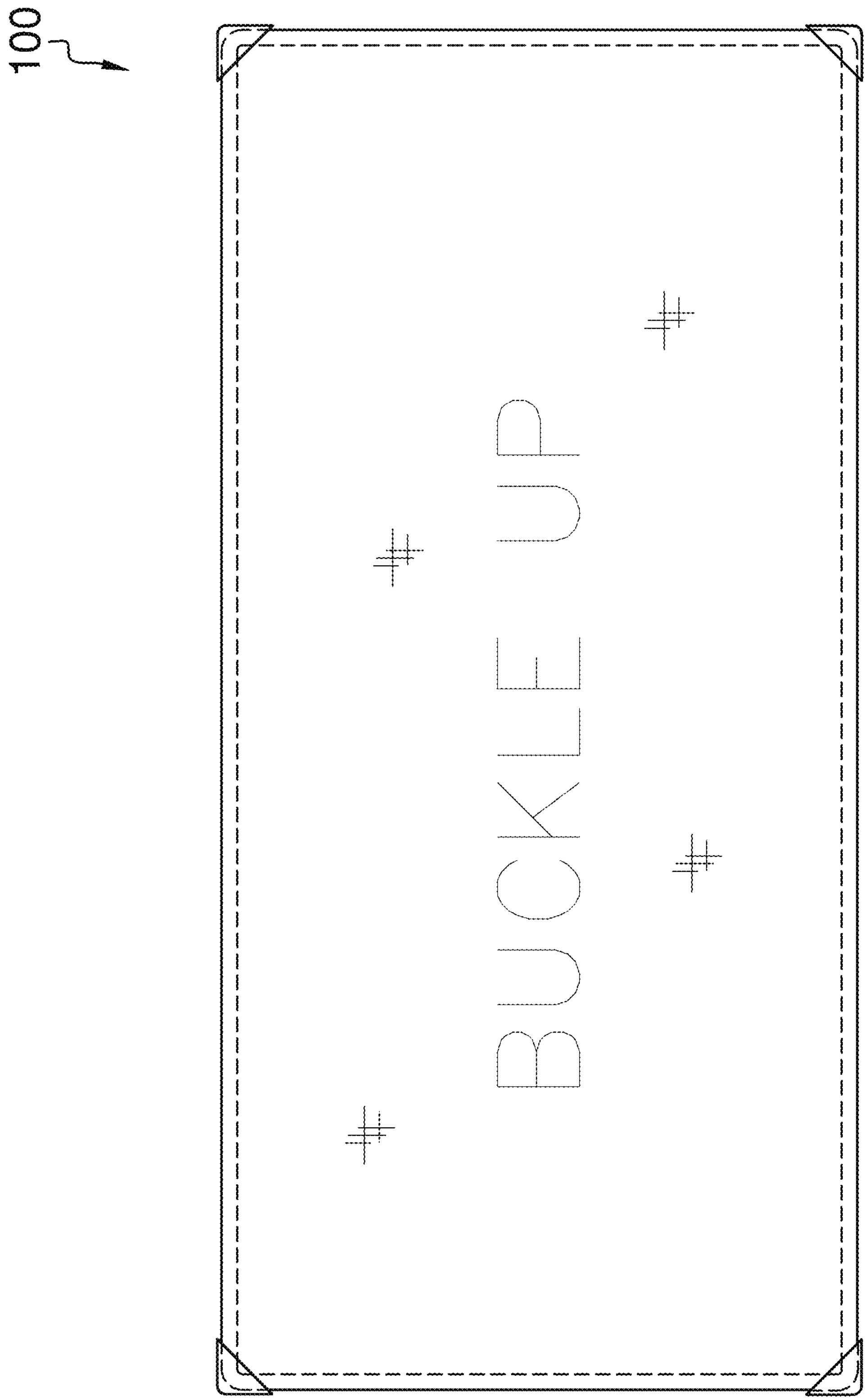
FIG. 5 is a front view of an alternative embodiment of the disclosure.
Figure 6:
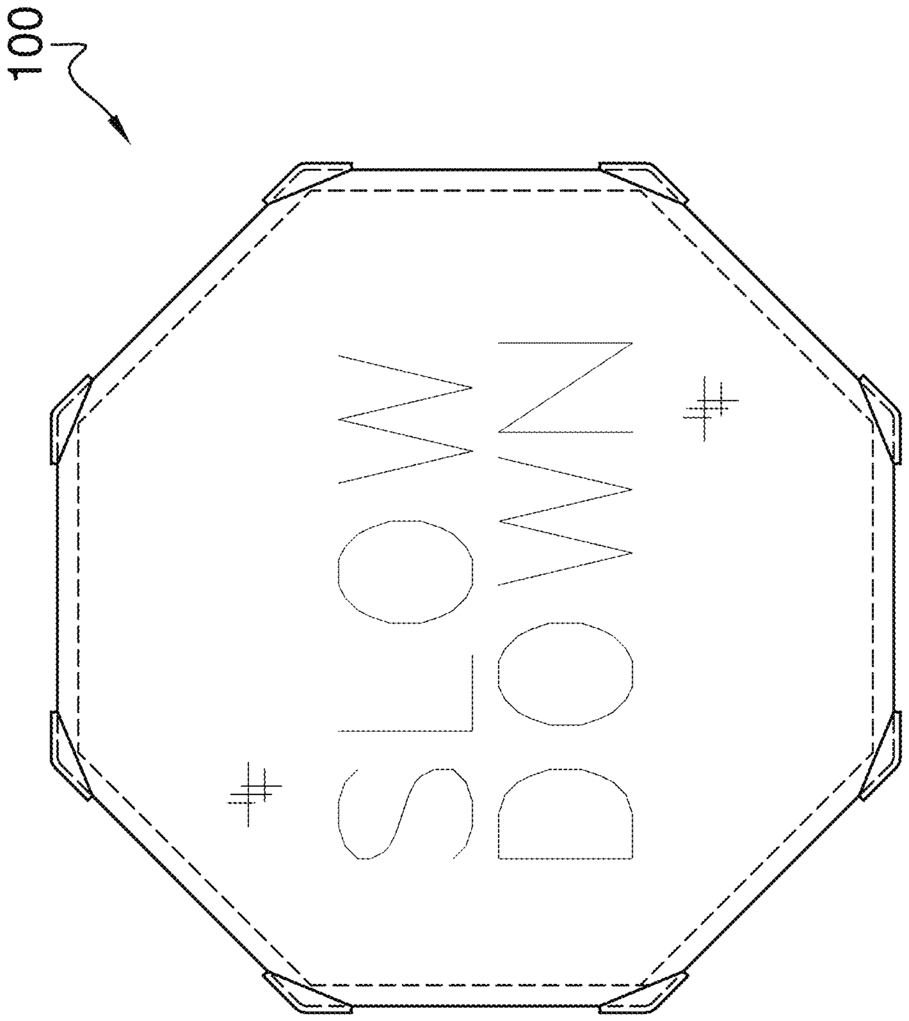
FIG. 6 is a front view of an alternative embodiment of the disclosure.

Detailed reference will now be made to one or more potential embodiments of the disclosure, which are illustrated in FIGS. 1 through 6.

The road sign covering system 100 (hereinafter invention) is a traffic control device. The invention 100 comprises a road sign structure 101 and an enclosure structure 102. The invention 100 is a temporary device used to reconfigure the sentiment generated by the road sign structure 101 by changing the image displayed from the road sign structure 101. The invention 100 forms a protection space that prevents the original image on the road sign structure 101 from generating misleading sentiments regarding the temporary traffic control instruction currently in effect. The road sign structure 101 is the structure of the invention 100 that presents the permanent traffic control instruction intended to be displayed at a location. The enclosure structure 102 is the structure that: a) obscures the permanent traffic control instruction displayed by the road sign structure 101; and, b) displays the temporary traffic control instruction currently in effect.

The road sign structure 101 is the structure of the invention 100 that displays the permanent traffic control instruction. The road sign structure 101 is placed in a permanent location. The road sign structure 101 forms a placard that displays the permanent traffic control instruction. The road sign structure 101 comprises a rs plate 111 and a rs image 112. As a preliminary note, the acronym "rs" is being used to refer to road sign.

The rs plate 111 is a rigid structure. The rs plate 111 is a disk shaped structure. The rs plate 111 is permanently mounted in a location. The rs plate 111 is visible to traffic from its permanent location. The rs plate 111 text.

The rs image 112 is an image that is displayed from the rs plate 111. The rs image 112 is displayed from a congruent end of the disk shape of the rs plate 111. The rs image 112 presents one or more indicia. The one or more indicia presented by the rs image 112 generates a sentiment within the traffic that indicates the permanent traffic control instruction is currently in effect.

The enclosure structure 102 has the primary shape of a sheeting. The enclosure structure 102 has an opaque structure. The enclosure structure 102 forms the protection space of the invention 100. The enclosure structure 102 temporarily attaches to the road sign structure 101 such that the enclosure structure 102 forms a blind that conceals the permanent traffic control instruction displayed by the road sign structure 101. The enclosure structure 102 removably attaches to the road sign structure 101. The enclosure structure 102 visibly displays the temporary traffic control instruction displayed by the enclosure structure 102 that is in current effect. The enclosure structure 102 comprises a framework structure 121 and a blind structure 122.

The blind structure 122 is a sheeting structure. The blind structure 122 is a flexible structure. The blind structure 122 forms the protection space that obscures the permanent traffic control instruction from view. The blind structure 122 is an opaque structure. The blind structure 122 removably attaches to the rs plate 111 of the road sign structure 101 such that the blind structure 122 encloses the rs image 112 within the protection space. The blind structure 122 comprises a blind sheeting 141 and a blind image 142.

The blind sheeting 141 is a sheeting structure. The blind sheeting 141 is a flexible structure. The blind sheeting 141 is an opaque structure. The blind sheeting 141 forms the protection space that obscures the rs image 112 of the road sign structure 101. The blind sheeting 141 is geometrically similar to the congruent end of the rs plate 111 that displays the rs image 112. The blind sheeting 141 is sized such that the blind sheeting 141 fully encloses the congruent end of the rs plate 111 that displays the rs image 112 within the protection space. The opaque nature of the blind sheeting 141 physically obscures the rs image 112. The blind sheeting 141 forms an interior congruent end and an exterior end. The exterior congruent end of the blind sheeting 141 is the surface that displays the blind image 142. The interior congruent end of the blind sheeting 141 is the surface that is proximal to the rs plate 111 of the road sign structure 101.

The blind image 142 is an image that is displayed from the blind sheeting 141. The blind image 142 is displayed from the exterior congruent end of the rs plate 111. The blind image 142 presents one or more indicia. The one or more indicia presented by the blind image 142 generates a sentiment within the traffic that indicates the temporary traffic control instruction is currently in effect.

The framework structure 121 is a mechanical apparatus. The framework structure 121 temporarily attaches the blind structure to the rs plate 111 of the road sign structure 101. The framework structure 121 holds the blind structure 122 in a fixed position relative to the rs plate 111. The framework structure 121 comprises a plurality of magnetic structures 131 and a plurality of clip structures 132.

The plurality of magnetic structures 131 form a magnetic fastening device. Each magnetic strip selected from the plurality of magnetic structures 131 attaches to the interior congruent end of the blind sheeting 141 of the blind structure 122. The plurality of magnetic structures 131 magnetically attaches the blind sheeting 141 to the rs plate 111 of the road sign structure 101. The plurality of magnetic structures 131 removably attaches the blind sheeting 141 to the rs plate 111.

The plurality of clip structures 132 form a fastening device. The plurality of clip structures 132 removably attaches the blind structure 122 to the rs plate 111 of the road sign structure 101. The plurality of clip structures 132 anchors the blind structure 122 to the perimeter edge of the rs plate 111. The plurality of clip structures 132 attach to the perimeter of the rs plate 111 with a tight fit.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Associate: As used in this disclosure, the term associate is used to describe a relationship between a first object and a second object. The use of the term associated implies both: a) that the first object works with the second object in order to accomplish a task necessary for the implementation of the invention (such as joining two objects together); and, b) the relationship remains stable through the accomplishment of the task. By stable is meant that neither the first object or the second object are intended to be interchanged with a third object during the use of the invention.

Blind: As used in this disclosure, a blind is a structure that is used to conceal a person or an object.

Boundary Structure: As used in this disclosure, a boundary structure is a barrier that separates a first object from a second object such that the second object cannot damage the first object.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clip: As used in this disclosure, a clip is a fastening device that attaches to an anchor structure. The clip is an elastic structure that grips the anchor structure such that the anchor structure deforms the clip. The anchor structure prevents the clip from returning to its relaxed position such that the clip applies a pressure to the anchor structure. By grip is meant that the pressure applied by the clip to the anchor point ensures that clip attaches to the anchor structure with a tight fit.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Fitted: As used in this disclosure, the term fitted refers to two geometrically similar structures wherein the smaller geometrically similar structure inserts into the larger geometrically similar structure.

Flexible: As used in this disclosure, flexible refers to an object or material that will deform when a force is applied to it but that will not necessarily return to its original shape when the deforming force is removed.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Frame: As used in this disclosure, a frame is a structure or a first sub-structure: a) to which an object or a second sub-structure attaches; and, b) which forms a portion of the load path of the object or the second sub-structure.

Framework: As used in this disclosure, a framework refers to the substructure of an object that forms a load path for the object.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Image: As used in this disclosure, an image is an optical representation or reproduction of an indicia or of the appearance of something or someone.

Indicia: As used in this disclosure, the term indicia refers to a set of markings that identify a sentiment.

Inelastic Nature: As used in this disclosure, an inelastic nature refers to a flexible structure that maintains its new shape after the flexible structure has been deformed.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Magnet: As used in this disclosure, a magnet is an ore, alloy, or other material that has its component atoms arranged so the material exhibits properties of magnetism such as: 1) attracting other iron-containing objects; 2) attracting other magnets; or, 3) or aligning itself in an external magnetic field. A magnet is further defined with a north pole and a south pole. By aligning with an external magnetic field is meant that the north-south pole structure of a first magnet will align with the north south pole of a second magnet. The pole of any first magnet will attract the opposite pole of any second magnet (i.e. a north pole will attract a south pole). A permanent magnet refers to an object that presents a magnetic field without requiring the presence of an electric current.

Magnetic Material: As used in this disclosure, a magnetic material is a substance that attracts or is attracted to a magnet but that itself has no net magnetic moment (beyond any residual moment created by prior use). Common classes of magnetic materials include ferromagnetic, diamagnetic, paramagnetic, ferrimagnetic and antiferromagnetic.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Opaque: As used in this disclosure, opaque refers to an object or material that prevents the passage of radiation through the object or material.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) a congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Perimeter: As used in this disclosure, a perimeter is one or more curved or straight lines that bounds an enclosed area on a plane or surface. The perimeter of a circle is commonly referred to as a circumference.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protection Space: As used in this disclosure, a protection space is a space formed by a boundary structure. The boundary structure forms a protective barrier that protects the environment surrounding the protection space from potential dangers from the operation of a device or process contained within the protection space.

Relaxed Shape: As used in this disclosure, a structure is considered to be in its relaxed state when no shear, strain, or torsional forces are being applied to the structure.

Roughly: As used in this disclosure, roughly refers to a comparison between two objects. Roughly means that the difference between one or more parameters of the two compared objects are not significantly different.

Semitransparent: As used in this disclosure, semitransparent refers to an object that is partially transparent. By partially transparent is meant: a) that only a proportion of the light that strikes a semitransparent structure will pass through the semitransparent structure; and, b) that the light is scattered as it passes through the semitransparent structure such that objects cannot be clearly seen through the semitransparent structure.

Sentiment: As used in this disclosure, a sentiment refers to a symbolic meaning or message that is communicated through the use of an object or an image, potentially including a text based image. See image and optical character recognition.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Sign: As used in this disclosure, a sign is a placard that displays an image, potentially including a text based image, which contains some form of a sentiment.

Supervision: As used in this disclosure, supervision refers to an individual or system that observes and provides direction for the operation of: a) one or more individuals; or, b) a process.

Textile: As used in this disclosure, a textile is a material that is woven, knitted, braided or felted. Synonyms in common usage for this definition include fabric and cloth. The two surfaces of the textile with the greatest surface area are called the faces of the textile.

Tight Fit: As used in this disclosure, a tight fit refers to the insertion of a first object into a second object such that there is not a lot of space between the first object and the second object. By not a lot of space is meant that friction occurs when the first object moves within the second object. Traffic: As used in this disclosure, traffic refers to the simultaneous movement of a plurality of vehicles and pedestrians.

Traffic Control: As used in this disclosure, traffic control refers to a system of rules and signals that supervise the flow of traffic over a road network.

Traffic Control Signal: As used in this disclosure, a traffic control signal is an electrically powered device. The traffic control signal generates one or more visual distinct signals used for directing and controlling traffic flow through a location. A traffic control signal is often called a traffic light.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Vertex: As used in this disclosure, a vertex (plural vertices) is an angle that is formed by two lines (or a plurality of surfaces) that form a point (or a brink). Vertices are commonly found in polygons, prisms and pyramids.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Visible: As used in this disclosure, the term visible refers to the ability of an individual (referred to as a viewer) to see an object. The term visible implies that the direct "line of sight" between a viewer and the object does not have any opaque or semitransparent barriers between the viewer and the object that would inhibit the transmission of electromagnetic radiation between the viewer and the object. The term visibility is used to mean that an object is visible from the position of a viewer.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A road sign covering system to temporarily reconfigure sentiment generated on a road sign by changing an image displayed from the road sign:

the system comprising a road sign structure and an enclosure structure;

wherein the enclosure structure encloses the road sign structure;

wherein the road sign structure comprises a road sign plate and a road sign image;

wherein the enclosure structure comprises a framework structure and a blind structure;

wherein the framework structure attaches to the blind structure;

wherein the framework structure comprises a plurality of magnetic structures and a plurality of clip structures;

wherein the plurality of magnetic structures attach to a flexible opaque blind sheeting of the blind structure;

wherein the plurality of clip structures attach to the blind sheeting of the blind structure;

wherein the plurality of magnetic structures magnetically attaches the blind sheeting to the road sign plate of the road sign structure wherein the plurality of clip structures anchors the blind structure to perimeter edges of the road sign plate with a tight fit.

2. The road sign covering system according to claim 1 wherein the road sign image presents a permanent traffic control instruction;

wherein the enclosure structure a) obscures the permanent traffic control instruction displayed by the road sign structure; and, b) displays a temporary traffic control instruction.

3. The road sign covering system according to claim 2 wherein the road sign structure is placed in a permanent location;

wherein the road sign plate forms a placard that displays the permanent traffic control instruction.

4. The road sign covering system according to claim 3 wherein the enclosure structure removably attaches to the road sign structure;

wherein the enclosure structure visibly displays the temporary traffic control instruction.

5. The road sign covering system according to claim 4 wherein the blind structure comprises the blind sheeting and the temporary traffic control instruction;

wherein the temporary traffic control instruction is displayed from the blind sheeting.

6. The road sign covering system according to claim 5 wherein the blind sheeting is geometrically similar to a congruent end of the road sign plate;

wherein the blind sheeting is sized such that the blind sheeting fully encloses the congruent end of the road sign plate.

7. The road sign covering system according to claim 6 wherein the plurality of magnetic structures form a magnetic fastening device.

8. The road sign covering system according to claim 7 wherein the plurality of clip structures form a fastening device.

* * * * *